March 13, 1956 S. M. WAAS 2,738,156
LID ASSEMBLY FOR POPCORN KETTLES
Filed Jan. 15, 1951
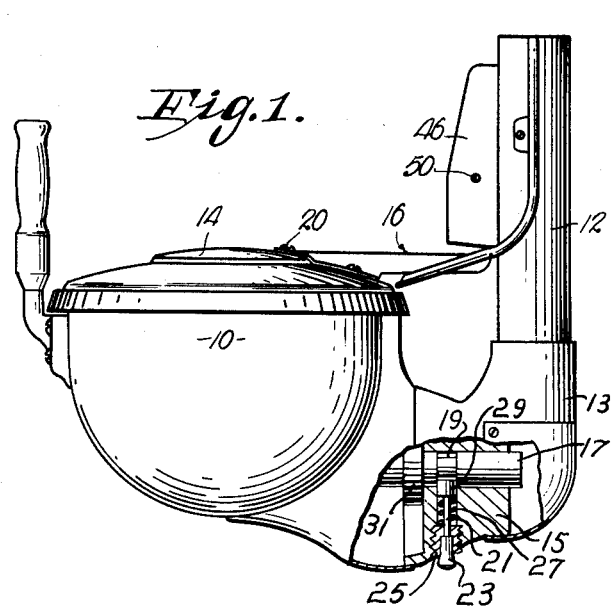
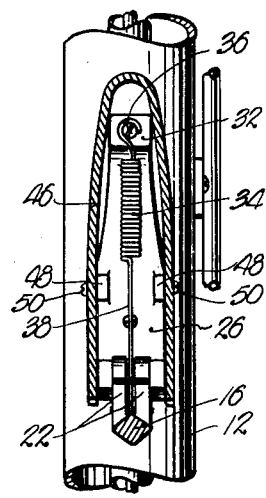
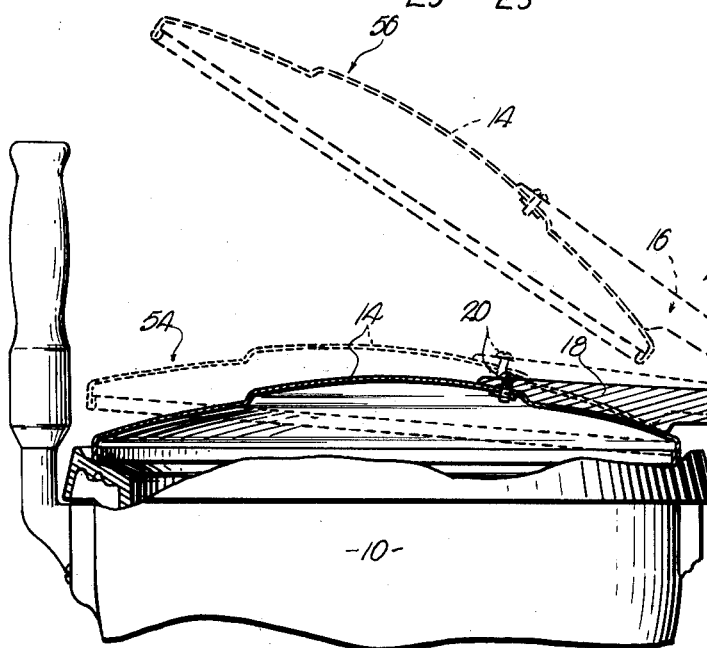
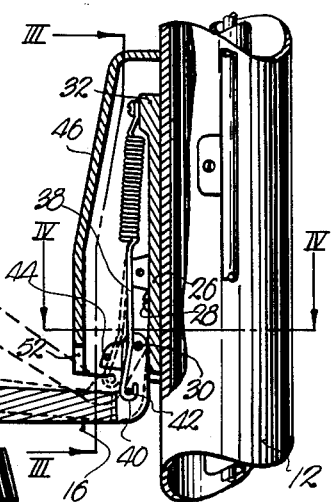
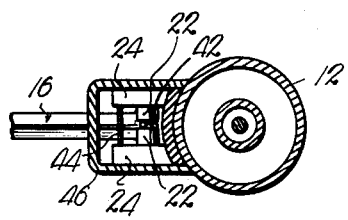
INVENTOR.
Samuel M. Waas
BY
ATTORNEY United States Patent Office 2,738,156
Patented Mar. 13, 1956

2,738,156

LID ASSEMBLY FOR POPCORN KETTLES

Samuel M. Waas, Kansas City, Mo., assignor to Manley, Inc., Kansas City, Mo., a corporation of Missouri Application January 15, 1951, Serial No. 205,982

2 Claims. (Cl. 248—292)

This invention relates to popcorn machines and has to do specifically and solely with a lid assembly for the popping kettle of such machines.

In automatic popcorn machines, it is highly desirable to provide a lid for the popping kettle that will respond to the popping of the corn within the kettle so far as moving toward an open position is concerned in order to attain full volume from a predetermined number of kernels. In other words, as the kernels pop and therefore expand, filling the popping kettle with the popped corn, it is necessary that expansion not be impeded in order to obtain a large volume of popcorn from a minimum number of kernels.

It is the most important object of the present invention therefore, to provide a lid assembly that is light in weight and provided with automatic opening means that is highly sensitive to the rise of popcorn within the kettle, all to the end that the lid will be highly responsive to the condition of the popcorn and not interfere in any way with the popping operations.

Another object of this invention is to provide a novel lid arrangement for popcorn kettles pivotally mounted for swinging movement toward and away from the open top of the kettle and separate therefrom, all in a manner to provide perfect balance and therefore, extremely efficient operation over an indefinite period of time.

A further object of this invention is to provide a lid assembly that includes a spring formed and arranged with respect to the lid so as to automatically and quickly elevate or swing the lid to a fully open position upon overcoming of a center of balance by the action of the popcorn itself rising within the popping kettle.

A still further object of this invention is to provide a swingable lid assembly for popcorn kettles including the aforementioned spring, wherein the arrangement is such as to require the popped corn to overcome the weight of the lid only and in this respect to form and dispose the spring so that the force thereof which must be overcome by the popped corn, is virtually negligible.

Other equally important objects include details of construction as above indicated, all of which will be made clear as the following specification progresses, reference being had to the accompanying drawing, wherein:

Figure 1 is a side elevational view of a lid assembly for popcorn kettles made according to the present invention and showing the same in a closed condition with respect to its kettle, parts being broken away and in section to reveal details of construction.

Fig. 2 is an enlarged, fragmentary, side elevational view of the kettle with the lid and its associated parts in section to reveal details of construction.

Fig. 3 is a fragmentary, vertical, sectional view taken on line III—III of Fig. 2 looking in the direction of the arrows; and Fig. 4 is a fragmentary, detailed, cross-sectional view taken on line IV—IV of Fig. 2 looking in the direction of the arrows.

While attempts have heretofore been made to provide in popcorn machines a lid assembly for the kettle thereof that will automatically respond to the popped corn, such prior constructions have not been fully satisfactory because of the fact that forces have been present to be overcome by the rising popcorn in the kettle of such magnitude as to tend to compress the popcorn and therefore, impede full expansion and attainment of desired volume.

As will hereinafter appear, the lid assembly hereof is placed in automatic operation by the rising popcorn in the kettle immediately upon contact thereof with the swinging lid, there being very little force necessary to cause the lid to automatically spring open to a position spaced from the open top of the kettle.

The kettle assembly per se forms no part of the present invention and is fully disclosed in my co-pending application filed on even date herewith and entitled, Kettle Construction for Popcorn Machines, Serial No. 205,983. Similarly, a suitable popcorn cabinet within which the kettle assembly may be mounted, forms the subject matter of my application for design Letters Patent filed on even date herewith and entitled, Popcorn Machine Cabinet, now Patent No. D. 163,497.

In the drawing there is illustrated an open top popping kettle broadly designated by the numeral 10 and mounted upon a vertically disposed supporting tube 12; a lid 14 is provided for the open top of the kettle 10 also mounted upon the vertical tube 12 but entirely separate from the kettle 10 as will hereinafter be made clear.

The lid 14 is dome-shaped as shown in Figs. 1 and 2 and is preferably made of extremely light-weight, yet durable metallic material. A laterally extending L-shaped arm 16 is provided with an elongated leg 18 that is normally disposed with its longitudinal axis in a horizontal plane above the kettle 10 as shown in Figs. 1 and 2 and is secured at one end thereof to the lid 14 which it overlies, by a plurality of bolts or the like 20. L-shaped arm 16 is also provided with a normally vertical, upstanding leg comprising a pair of spaced-apart ears 22 that are in turn embraced by a pair of spaced extensions 24 on a bracket 26. Plate-like brackets 26 is secured to the tube 12 by a number of screws or the like 28 conforming to the arcuate contour of tube 12 as illustrated in Fig. 4.

A pivot pin 30 for swingably mounting the lid 14 on a substantially horizontal axis joins the two spaced-apart extensions 24 and extends through the two ears 22 of arm 16. The plate-like bracket 26 is provided with a boss 32 at the uppermost end thereof for receiving one end of a vertical coil spring 34 by means of a screw 36. Spring 34 is provided with a relatively long stem 38 at the lowermost end thereof terminating in a hook 40 that is looped beneath a cross pin 42 joining the ears 22 below pivot pin 30 thereby pivotally joining the spring 34 with the arm 16. The distance between the ears 22 is sufficiently great to adequately clear the elongated stem 38 of spring 34. The extent of outward swinging movement of the stem 38 during operation of the lid assembly is limited by a third pin 44 in spaced, parallelism with the pins 30 and 42 and within a horizontal plane between pins 30 and 42. In order to assure proper operation, the stem 38 is bent outwardly at its lowermost end just above the pin 30 toward the pin 44 as depicted by Fig. 2.

Spring 34, together with bracket 26, are hidden from view by means of an open bottom housing 46 that is U-shaped in cross-section as shown in Fig. 4 of the drawing and secured to a pair of spaced-apart ears 48 extending laterally from the bracket 26 intermediate the ends thereof.

Screws or the like 50, passing through the sides of housing 46 extend into the ears 48 and serve as a means for removably mounting the housing 46 upon the tube 12. The normally front face of the housing 46 is provided with a notch 52 at the lowermost edge thereof for clearing the leg 18 of arm 16 as lid 14 swings toward and away from the closed condition with respect to the open top of kettle 10.

When the lid 14 is at the lowermost end of its path of travel, closing the open top of kettle 10, its associated parts take the position illustrated in full lines by Fig. 2 of the drawing. The stem 38 of spring 34 is substantially vertical and spaced away from the stop pin 44 and the lid 14 rests lightly upon the kettle 10 by force of gravity. While spring 34 has some effect upon the lid 14 when in such condition to hold the lid 14 against upward swinging movement, such force of the spring 34 is virtually negligible and all that need be overcome to raise the lid 14, is its inherent weight. As soon as corn within the kettle 10 begins to pop and rise within the kettle 10 to a point where the same contacts the lid 14, the latter will immediately rise to the position shown by dotted lines 54 in Fig. 2 of the drawing. Lid 14 and the arm 16 are free to swing on the pivot pin 30 during such rising movement of the lid 14 and very little force on the part of the popped corn is needed to cause lid 14 to assume the initial position 54 of Fig. 2. As soon as lid 14 rises slightly away from the kettle 10, spring 34 comes into operation to automatically and quickly elevate lid 14 to the dash-line position 56 shown in Fig. 2.

It is noteworthy that as the lid 14 travels from the closed position to the fully open position 56, stem 38 being pivotally connected to pin 42, swings to the left as shown in Fig. 2 to a position where it engages the stop pin 44, thereby limiting the extent of upward swinging movement of lid 14. Because of the inherent resiliency of spring 34 and the ends thereof, it will swing on the pin 36 toward and away from the bracket 26 without interfering in any way with the desired operation of the lid assembly.

It is noteworthy in addition to the foregoing that mounting of the lid 14 separately from the kettle 10, permits the operator to swing the kettle 10 to a dumping position as desired and to remove the same from the support 12 while the lid 14 remains mounted thereon. The means for swingably mounting the kettle 10 and rendering the same removable from tube 12 is illustrated in Fig. 1, and comprises, generally, a shaft 17 rotatable within fixed bearing 15 in lower section 13 of supporting tube 12. The shaft 17 is rigidly attached to kettle 10, the later being rotatable therewith. The flange 31 on shaft 17 limits the extent of movement of the shaft 17 and kettle 10 in one direction. An elongated locking pin 21 is biased by spring 27 into normal engagement with shaft 17 within an annular groove 19 to prevent movement of shaft 17 and kettle 10 in the opposite direction. Spring 27 engages shoulder 29 of pin 21 at one end thereof, and engages plug 25 at its opposite end. Knob 23 on pin 21 permits actuation of pin 21 and removal of kettle 10 from supporting tube 12. A ball-detent (not shown), is provided in bearing 15 and shaft 17 for maintaining kettle 10 normally upright, as shown in Fig. 1, and is yieldable to the pressure necessary to swing kettle 10 about the axis of shaft 17.

While details of construction of the lid assembly hereof may be varied, such changes as fairly come within the spirit of this invention are contemplated hereby and it is therefore, desired to be limited only by the scope of the appended claims.

Having thus described the invention, what I claim as new and desire to secure by Letters Patent is:

1. In a popcorn machine having a support, an open top kettle mounted on the support for swinging movement on a horizontal axis to and from a dumping position, and a lid normally disposed in a closed position over the open top of said kettle by gravitational force, structure for mounting the lid for swinging movement to and from an open position spaced from the kettle, permitting swinging of the latter to said dumping position, said structure comprising an L-shaped arm having an elongated leg and a pair of spaced, upturned ears on one end of the leg; means securing the leg at its opposite end to the lid; a first pin on the support traversing the ears for mounting the arm for swinging movement on a horizontal axis; an elongated coil spring having its longitudinal axis substantially perpendicular to the longitudinal axis of the leg and substantially vertical when the lid is closed; fastening means securing one end of the spring to the support; a stem on the opposite end of the spring and between said ears; a second pin traversing said ears in spaced parallelism to the first pin and secured to the ears for swinging movement with the ears on an arc concentric to the axis of said first pin; and means pivotally connecting the stem to the second pin for swinging movement of the stem toward and away from the first pin as the lid swings toward and away from the closed position respectively, said first pin being disposed between said fastening means and the second pin substantially within a vertical line passing through said axis of the spring and joining the fastening means and the second pin when the lid is closed, said spring being longitudinally stretched when the lid is closed, whereby on slight movement of the lid away from the kettle, the spring will swing the lid to a fully open position.

2. In a popcorn machine having a support, an open top kettle mounted on the support for swinging movement on a horizontal axis to and from a dumping position, and a lid normally disposed in a closed position over the open top of said kettle by gravitational force, structure for mounting the lid for swinging movement to and from an open position spaced from the kettle, permitting swinging of the latter to said dumping position, said structure comprising an L-shaped arm having an elongated leg and a pair of spaced, upturned ears on one end of the leg; means securing the leg at its opposite end to the lid; a first pin on the support traversing the ears for mounting the arm for swinging movement on a horizontal axis; an elongated coil spring above the ears, having its longitudinal axis substantially perpendicular to the longitudinal axis of the leg and substantially vertical when the lid is closed; fastening means securing one end of the spring to the support; a stem on the opposite end of the spring and between said ears, said stem being between the lid and said first pin; a second pin traversing said ears below the first pin, in spaced parallelism to the first pin and secured to the ears for swinging movement with the ears on an arc concentric to the axis of said first pin; and means pivotally connecting the stem to the second pin for swinging movement of the stem toward and away from the first pin as the lid swings toward and away from the closed position respectively, said first pin being disposed between said fastening means and the second pin substantially within a vertical line passing through said axis of the spring and joining the fastening means and the second pin when the lid is closed, said spring being longitudinally stretched when the lid is closed, whereby on slight movement of the lid away from the kettle, the spring will swing the lid to a fully open position.

References Cited in the file of this patent

UNITED STATES PATENTS

| | | |
|---|---|---|
| 1,930,841 | Miniere | Oct. 17, 1933 |
| 1,938,569 | Cretors | Dec. 12, 1933 |